United States Patent [19]

Orsini et al.

[11] Patent Number: 4,643,683

[45] Date of Patent: Feb. 17, 1987

[54] ECO SET DIDACTIC BLOCKS/CUBES

[76] Inventors: Milagros C. Orsini; George Spector, both of 233 Broadway Rm 3615, New York, N.Y. 10007

[21] Appl. No.: 734,457
[22] Filed: May 15, 1985
[51] Int. Cl.$^4$ ................................................ G09B 1/24
[52] U.S. Cl. ................................ 434/403; 434/170; 434/211
[58] Field of Search ............... 40/21 C; 434/170, 171, 434/172, 173, 211, 403

[56] References Cited

U.S. PATENT DOCUMENTS

| 157,113 | 11/1874 | Baade | 434/173 |
|---|---|---|---|
| 312,420 | 2/1885 | Anderson | 434/403 |
| 2,378,755 | 6/1945 | Dowling | 40/21 C |
| 2,680,315 | 6/1954 | McHugh | 40/21 C X |
| 3,214,852 | 11/1965 | Ford | 40/21 C |
| 3,488,880 | 1/1970 | Taylor | 434/403 X |
| 3,628,453 | 12/1971 | Jackson | 434/173 X |

OTHER PUBLICATIONS

"Color and Shape Mobile," p. 32 of Developmental Learning Materials, 1977 catalog.

Primary Examiner—Harland S. Skogquist

[57] ABSTRACT

A set of didactic blocks to be used by children is provided and consists of a plurality of different shaped geometric solid members and a plurality of indicia associated with the geometric solid members to stimulate artistic creativity and at the same time teach children mathematics, science, language and the like when the blocks are manipulated in play.

2 Claims, 6 Drawing Figures

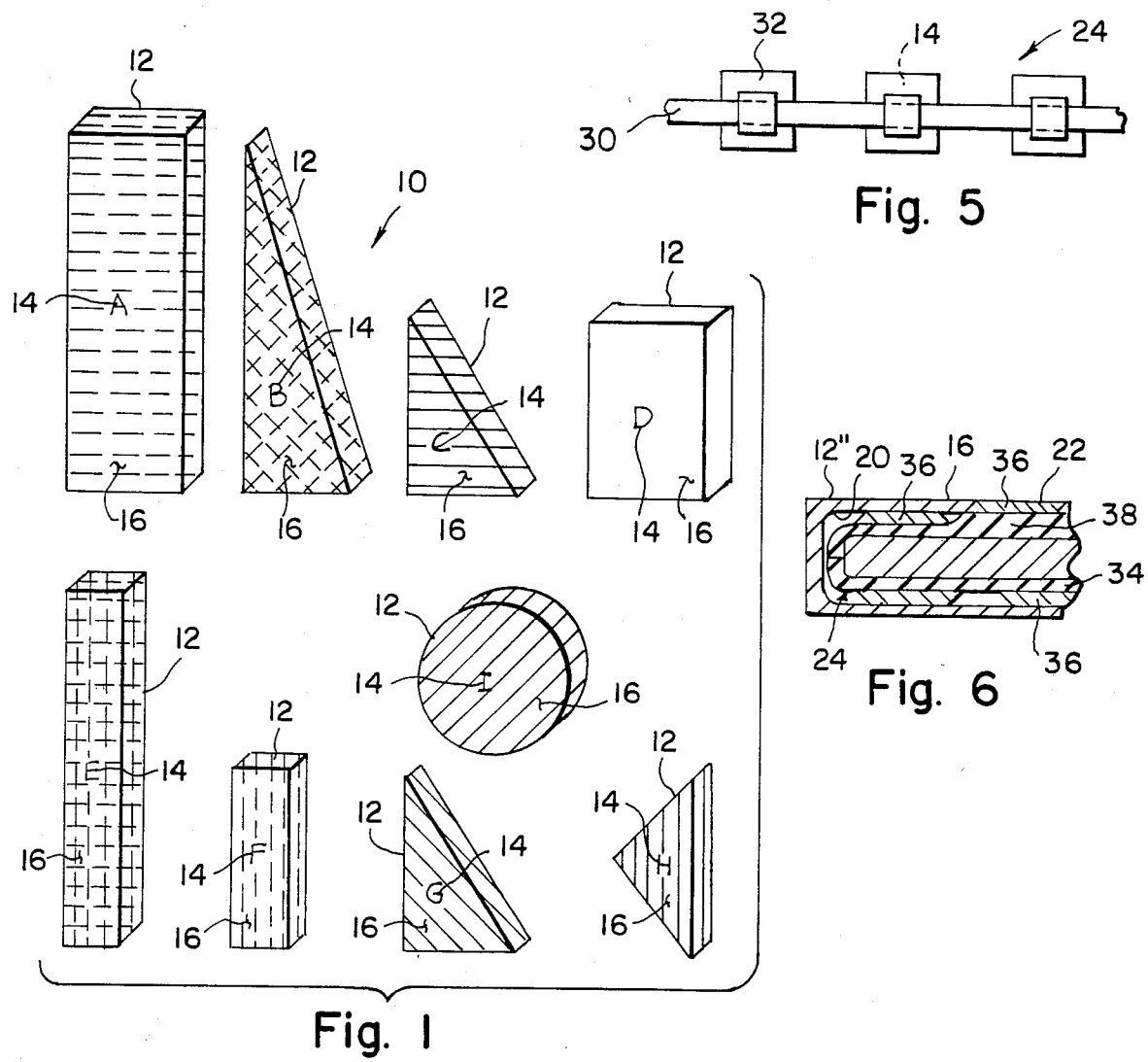

ECO SET DIDACTIC BLOCKS/CUBES

BACKGROUND OF THE INVENTION

The instant invention relates generally to toy blocks and more specifically it relates to a set of didactic blocks to be used by children.

Numerous toy blocks have been provided in prior art that are adapted to facilitate the study of geometry and to afford recreation and amusement. For example, U.S. Pat. Nos. 143,835; 741,949 and 4,258,479 all are illustrative of such prior art. While these units may be suitable for the particular purpose to which they address, they would not be as suitable for the purposes of the present invention as hereafter described.

SUMMARY OF THE INVENTION

A principle object of the present invention is to provide a set of didactic blocks in a variety of geometrical shapes to stimulate the artistic creativity of children when the blocks are manipulated in play.

Another object is to provide a set of didactic blocks that will be labeled with printed information accordingly to teach children mathamatics, science, language, etc. when the blocks are manipulated in play.

An additional object is to provide a set of didactic blocks that will be labeled with interchangable printed information, such as to be utilized by children in low, intermediate and advanced grades.

A further object is to provide a set of didactic blocks that are simple and easy to use.

A still further object is to provide a set of didactic blocks that are economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appeneded claims.

BRIEF DESCRIPTION OF THE DRAWING FIGURES

FIG. 1 is a perspective view of the invention showing various shaped blocks.

FIG. 2 is a front view of a modification showing a block having a window and endless belt therein with information printed thereon.

FIG. 3 is an enlarged cross sectional view taken along line 3—3 in FIG. 2.

FIG. 4 is a partial front view of the endless belt.

FIG. 5 is a partial back view of another form of the endless belt being an elastic band having various slip on tags with information printed thereon.

FIG. 6 is a partial cross sectional view of another modification which permits changing the viewed indicia tabs mounted on a compressible movable belt wherein an indicia tab will project out to the surface of a viewing window.

DETAILED DESCRIPTION OF THE PREFERRED EMBODIMENTS

Turning now descriptively to the drawings, in which similar reference characters denote similar elements throughout the several views, FIG. 1 illustrates a set of didactic blocks 10 that consists of a plurality of geometric solid members 12. Each geometric solid member 12 has a different shape and color to stimulate artistic creativity of the children when the blocks 10 are manipulated in play.

A plurality of indicia 14 as indicated by letters "A" to "I" is provided. Each said indicia 14 has different information and is associated with each geometric solid member 12. This teaches the children mathamatics, science, language and the like when the blocks 10 are manipulated in play. Each indicia 14 is printed on one surface 16 of each geometric solid member 12 to indicate information for children in low, intermediate and advance grades.

FIG. 2, 3 and 4 shows a first modified geometric solid member 12' having an endless horizontal track 20 within and a window 22 in alignment with the endless track. A movable elongated band 24 is provided that has the indicia 14 printed thereon. The elongated band 24 is positioned within the endless track 20. The indicia 14 can be viewed through the window 22 in the geometric solid member 12' indicating information in relationship to the geometric solid member.

The geometric solid member 12' contains a removable door 26 in alignment with the endless track 20 opposite the window 22. The movable elongated band 24 can be easily positioned within and removed from the endless track 20 when the door 26 is removed. A transparent removable panel 28 is placed within the window 22 to seal the window to prevent dirt and moisture from entering the endless track 20.

FIG. 5 shows another form of the elongated band 24 from the back. It consists of an elastic belt 30 so that the belt can stretch around the endless track 20. A plurality of tags 32 has the indicia 14 printed thereon. Each tag 32 is positioned on the elastic belt 30 so that the indicia can be viewed through the window 22.

FIG. 6 shows a second modified geometric solid member 12" wherein the movable elongated band 24 consists of a compressible belt 34 so that the belt can extend around the endless track 20 and a plurality of tags 36 that have indicia 14 printed thereon. Each tag 36 is spaceably mounted on the compressible belt 34. When one of the tags 36 is positioned under the window 22 the compressible belt 34 will expand at 38 allowing the tag to project out to the surface 16 of the window 22 for viewing and sealing the window to prevent dirt and moisture from entering the endless track 20. The window 22 is beveled and the tags 36 are beveled so that when the compressible belt 34 is moved the tags can easily slide into and out of the window.

While certain novel features of this invention have been shown and described and are pointed out in the annexed claims, it will be understood that various omissios, substitutions and changes in the forms and details of the device illustrated and in its operation can be made by those skilled in the art without departing from the spirit of the invention.

What is claimed is:

1. A set of didactic blocks to be used by children which comprises:
   (a) a plurality of geometric solid blocks each said geometric solid block having a different shape to stimulate artistic creativity of said children when said blocks are manipulated in play; and
   (b) a plurality of indicia, each said indicia having different information and associated with each said geometric solid to teach said children mathematics, science, language and the like when said blocks are manipulated in play, wherein each said geometric block having a track within, and a window in alignment with said track in combination with a moveable elongated band having said indicia printed thereon, said elongated band positioned on said track so that said indicia can be viewed through said window wherein said band includes spaced indicia with means for expansion through said window to expose said indicia and seal said window.

2. A set of didactic blocks as recited in claim 1, wherein said window is beveled, said indicia are beveled tags and wherein said means comprise compressible portions of said band on which said tags are mounted whereby said portions expand into said window when in alignment, wherein the beveling of said window and tags facilitate the expansion.

* * * * *